United States Patent Office 3,551,417
Patented Dec. 29, 1970

3,551,417
PESTICIDAL HETEROCYCLIC SULFIDES
Ted Symon, Lombard, and Anthony J. Guarnaccio, Niles,
Ill., assignors to Universal Oil Products Company, Des
Plaines, Ill., a corporation of Delaware
No Drawing. Continuation-in-part of application Ser. No.
398,086, Sept. 21, 1964. This application Aug. 28, 1967,
Ser. No. 663,561
Int. Cl. C07d 93/06
U.S. Cl. 260—243                          6 Claims

ABSTRACT OF THE DISCLOSURE

Novel compositions of matter comprising substituted sulfide compounds which are prepared by reacting a haloalkane which contains a phenoxy-, thiophenoxy-, or anilino substituents with a heterocyclic compound containing a sulfur substituent possess pestiologically active properties and are useful as pesticides.

This application is a continuation-in-part of our copending application Ser. No. 398,086, filed Sept. 21, 1964, now abandoned. This invention relates to novel compositions of matter and particularly to substituted sulfide compounds which possess useful properties. In addition, the invention is also concerned with a process for the preparation of the aforementioned compounds.

It has now been discovered that novel compositions of matter which are pestiologically active in nature may be prepared by reacting a haloalkane which contains a phenoxy, thiophenoxy or anilino substituent with an oxazolidinethione or oxazinidinethione. For purposes of this invention the terms "oxazolidinethione and oxazinidinethione" as used in the present specification and appended claims will also include the imidazolidinethiones, pyrimidinethiones, thiazolidinethiones and thiazinidinethiones. It is also contemplated within the scope of this invention that the term "pestiologically active" as used in the present specification and appended claims will refer to compounds which are effective as insecticides, fungicides, bactericides and, in addition, will also possess herbicidal properties. For example, the compounds 2(2,4-dichlorophenoxyethyl) - 4,4 - dimethyl - 4,5 - dihydro - 2-oxazolyl sulfide, 4(2,4,6-trichlorothiophenoxy butyl)-4,4-dimethyl-4,5-dihydro-2-pyrimidyl sulfide, and 4(2,4,6-trichlorothiophenoxy butyl) - 4,4-dimethyl-4,5-dihydro-2-thiazinyl sulfide which are prepared in a manner hereinafter set forth in greater detail will possess insecticidal activity especially against houseflies.

It is therefore an object of this invention to provide a process for preparing novel compositions of matter which are pestiologically active in nature.

A further object of this invention is to provide novel compositions of matter comprising sulfides containing substituents which render said compounds active against unwanted plants, insects, etc.

In one aspect and embodiment of this invention resides in a compound selected from the group consisting of compounds having the formulae:

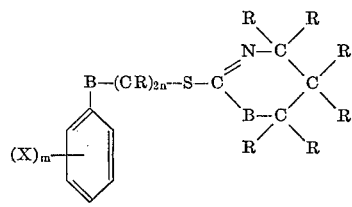

and

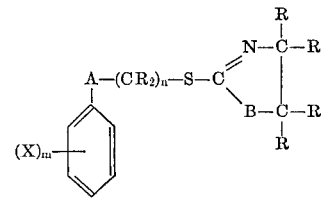

in which A is selected from the group consisting of oxygen and sulfur; B is selected from the group consisting of oxygen, sulfur and amino; R is selected from the group consisting of hydrogen, and lower alkyl; X is selected from the group consisting of hydrogen, halogen, nitro, cyano, hydroxy, lower alkoxy and lower thioalkoxy; $n$ is an integer of from 1 to 10; and $m$ is an integer of from 1 to 5.

A further embodiment of this invention is found in a process for the preparation of a compound selected from the group of compounds having the formulae:

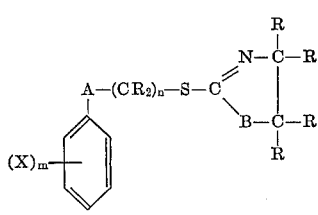

and

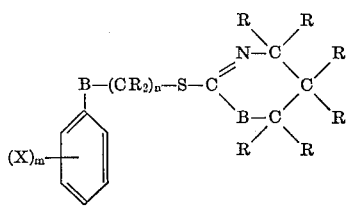

in which A is selected from the group consisting of oxygen and sulfur; B is selected from the group consisting of oxygen, sulfur and amino; R is selected from the group consisting of hydrogen, and lower alkyl; X is selected from the group consisting of hydrogen, halogen, nitro, cyano, hydroxy, lower alkoxy and lower thioalkoxy; $n$ is an integer of from 1 to 10; and $m$ is an integer of from 1 to 5 which comprise reacting a compound selected from the group consisting of phenoxy-, thiophenoxy-, and anilino haloalkanes with a compound selected from the group consisting of oxazolidinethiones and oxazinidinethiones in an alkaline medium at reaction conditions, and recovering the resultant product.

A specific embodiment of this invention is found in the compound 2(2,4-dichlorophenoxyethyl) - 4,4 - dimethyl-4,5-dihydro-2-oxazolyl sulfide.

Another specific embodiment of this invention is found in a process which comprises reacting 1 - bromo - 3-(2,4,6 - trichlorophenoxy propane) with 4,4 - dimethyl-2 - oxazolidinethione in an alkaline medium at reaction conditions, and recovering the resultant 3 - (2,4,6 - trichlorophenoxypropyl) - 4,4 - dimethyl - 4,5 - dihydro-2-oxazolyl sulfide.

Other objects and embodiments will be found in the following further detailed description of the present invention.

As hereinbefore set forth it has now been discovered that novel compositions of matter which possess activity as insecticides, bactericides, herbicides, etc. may be prepared by reacting a compound selected from the group consisting of phenoxy haloalkanes, thiophenoxy haloalkanes and anilino haloalkanes with a compound selected from the group consisting of oxazolidinethiones and oxazinidinethiones. The reaction between these compound is effected in the presence of a substantially inert organic solvent or diluent which is made alkaline in nature by the addition of a basic substance. The reaction conditions at which the novel compositions of matter of the present invention are prepared will include a temperature ranging from about 50° up to about 200° C., preferably at the reflux temperature of the particular organic solvent or diluent which is used as the reaction medium. It is contemplated within the scope of this invention that pressures ranging from atmospheric up to about 100 atmospheres may be used, the particular pressure being that which is necessary to maintain a major portion of the reactants in the liquid phase. Organic solvents or diluents which may be used include aromatic hydrocarbons such as benzene, toluene, o-xylene, m-xylene, p-xylene, etc.; paraffinic hydrocarbons such as n-pentane, n-hexane, etc.; cycloparaffinic hydrocarbons such as cyclopentane, methylcyclopentane, cyclohexane, etc.; alcohols such as methyl alcohol, ethyl alcohol, n-propyl alcohol, isopropyl alcohol, butyl alcohol, etc. Basic substances which may be utilized to effect the alkaline nature of the reaction medium include sodium hydroxide, potassium hydroxide, sodium carbonate, potassium carbonate, sodium alcoholates, potassium alcoholates, etc.

Examples of phenoxy-, thiophenoxy or anilino haloalkanes which may be used include those having the generic formula:

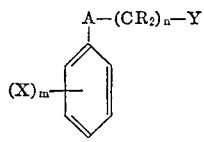

in which A is a radical selected from the group consisting of oxygen, amino and sulfur radicals; R is a radical selected from the group consisting of hydrogen and lower alkyl, radicals; X is a radical selected from the group consisting of hydrogen, halogen, nitro, cyano, hydroxy, lower alkoxy and lower thioalkoxy radicals; Y is a halogen radical selected from the group consisting of chloro, bromo, iodo and fluoro radicals; $n$ is an integer of from 1 to about 10; and $m$ is an integer of from 1 to 5, such as, 1-chloro-2-phenoxyethane,
1-bromo-2-phenoxyethane,
1-iodo-2-phenoxyethane,
1-fluoro-2-phenoxyethane,
1-chloro-2-thiophenoxyethane,
1-bromo-2-thiophenoxyethane,
1-iodo-2-thiophenoxyethane,
1-fluoro-2-thiophenoxyethane,
1-chloro-2-anilinoethane,
1-bromo-2-anilinoethane,
1-iodo-2-anilinoethane,
1-fluoro-2-anilinoethane,
1-chloro-2-(2,4-dichlorophenoxy)ethane,
1-bromo-2-(2,4-dichlorophenoxy)ethane,
1-iodo-2-(2,4-dichlorophenoxy)ethane,
1-fluoro-2-(2,4-dichlorophenoxy)ethane,
1-chloro-2-(2,4-dichlorothiophenoxy)ethane,
1-bromo-2,-(2,4-dichlorothiophenoxy)ethane,
1-iodo-2-(2,4-dichlorothiophenoxy)ethane,
1-fluoro-2-(2,4-dichlorothiophenoxy)ethane,
1-chloro-2-(2,4-dichloroanilino)-ethane,
1-bromo-2-(2,4-dichloroanilino)ethane,
1-iodo-2-(2,4-dichloroanilino)ethane,
1-fluoro-2-(2,4-dichloroanilino)ethane,
1-chloro-2-(2,4,6-trichlorophenoxy)ethane,
1-bromo-2-(2,4,6-trichlorophenoxy)ethane,
1-iodo-2-(2,4,6-trichlorophenoxy)ethane,
1-fluoro-2-(2,4,6-trichlorophenoxy)ethane,
1-chloro-2-(2,4,6-trichlorothiophenoxy)ethane,
1-bromo-2-(2,4,6-trichlorothiophenoxy)ethane,
1-iodo-2-(2,4,6-trichlorothiophenoxy)ethane,
1-fluoro-2-(2,4,6-trichlorothiophenoxy)ethane,
1-chloro-2-(2,4,6-trichloroanilino)ethane,
1-bromo-2-(2,4,6-trichloroanilino)ethane,
1-iodo-2-(2,4,6-trichloroanilino)ethane,
1-fluoro-2-(2,4,6-trichloroanilino)ethane,
1-chloro-3-(2,4-dichlorophenoxy)-propane,
1-bromo-3-(2,4-dichlorophenoxy)propane,
1-iodo-3-(2,4-dichlorophenoxy)propane,
1-fluoro-3-(2,4-dichlorophenoxy)-propane,
1-chloro-3-(2,4-dichlorothiophenoxy)propane,
1-bromo-3-(2,4-dichlorothiophenoxy)propane,
1-iodo-3-(2,4-dichlorothiophenoxy)propane,
1-fluoro-3-(2,4-dichlorothiophenoxy)propane,
1-chloro-3-(2,4-dichloroanilino)propane,
1-bromo-3-(2,4-dichloroanilino)propane,
1-iodo-3-(2,4-dichloroanilino)propane,
1-fluoro-3-(2,4-dichloroanilino)propane,
1-chloro-3-(2,4,6-trichlorophenoxy)propane,
1-bromo-3-(2,4,6-trichlorophenoxy)propane,
1-iodo-3-(2,4,6-trichlorophenoxy)propane,
1-fluoro-3-(2,4,6-trichlorophenoxy)propane,
1-chloro-3-(2,4,6-trichlorothiophenoxy)propane,
1-bromo-3-(2,4,6-trichlorothiophenoxy)propane,
1-iodo-3-(2,4,6-trichlorothiophenoxy)propane,
1-fluoro-3-(2,4,6-trichlorothiophenoxy)propane,
1-chloro-3-(2,4,6-trichloroanilino)propane,
1-bromo-3-(2,4,6-trichloroanilino)propane,
1-iodo-3-(2,4,6-trichloroanilino)propane,
1-fluoro-3-(2,4,6-trichloroanilino)propane,
1-chloro-4-(2,4-dichlorophenoxy)butane,
1-bromo-4-(2,4-dichlorophenoxy)butane,
1-iodo-4-(2,4-dichlorophenoxy)butane,
1-fluoro-4-(2,4-dichlorophenoxy)butane,
1-chloro-4-(2,4-dichlorothiophenoxy)butane,
1-bromo-4-(2,4-dichlorothiophenoxy)butane,
1-iodo-4-(2,4-dichlorothiophenoxy)butane,
1-fluoro-4-(2,4-dichlorothiophenoxy)butane,
1-chloro-4-(2,4-dichloroanilino)butane,
1-bromo-4-(2,4-dichloroanilino)butane,
1-iodo-4-(2,4-dichloranilino)butane,
1-fluoro-4-(2,4-dichloroanilino)butane,
1-chloro-2-(2,4-dinitrophenoxy)ethane,
1-bromo-2-(2,4-dinitrophenoxy)ethane,
1-iodo-2-(2,4-dinitrophenoxy)ethane,
1-fluoro-2-(2,4-dinitrophenoxy)ethane,
1-chloro-2-(2,4-dinitrothiophenoxy)ethane,
1-bromo-2-(2,4-dinitrothiophenoxy)ethane,
1-iodo-2-(2,4-dinitrothiophenoxy)ethane,
1-fluoro-2-(2,4-dinitrothiophenoxy)ethane,
1-chloro-2-(2,4-dinitroanilino)ethane,
1-bromo-2-(2,4-dinitroanilino)ethane,
1-iodo-2-(2,4-dinitroanilino)ethane,
1-fluoro-2-(2,4-dinitroanilino)ethane,
1-chloro-3-(2,4,6-trinitrophenoxy)propane,
1-bromo-3-(2,4,6-trinitrophenoxy)propane,
1-iodo-3-(2,4,6-trinitrophenoxy)propane,
1-fluoro-3-(2,4,6-trinitrophenoxy)propane,
1-chloro-3-(2,4,6-trinitrothiophenoxy)propane,
1-bromo-3-(2,4,6-trinitrothiophenoxy)propane,
1-iodo-3-(2,4,6-trinitrothiophenoxy)propane,
1-fluoro-3-(2,4,6-trinitrothiophenoxy)propane,
1-chloro-3-(2,4,6-trinitroanilino)propane,
1-bromo-3-(2,4,6-trinitroanilino)propane,
1-iodo-3-(2,4,6-trinitroanilino)propane,
1-fluoro-3-(2,4,6-trinitroanilino)propane,
1-chloro-2-(2-methoxyphenoxy)ethane,
1-bromo-2-(2-methoxyphenoxy)ethane,
1-iodo-2-(2-methoxyphenoxy)ethane,
1-fluoro-2-(2-methoxyphenoxy)ethane,
1-chloro-2-(2-methoxythiophenoxy)ethane,
1-bromo-2-(2-methoxythiophenoxy)ethane,
1-iodo-2-(2-methoxythiophenoxy)ethane,
1-fluoro-2-(2-methoxythiophenoxy)ethane, 1chloro-2-(2-methoxyanilino)ethane,
1-bromo-2-(2-methoxyanilino)ethane,
1-iodo-2-(2-methoxyanilino)ethane,
1-fluoro-2-(2-methoxyanilino)ethane,
1-chloro-3-(2,4-dimethoxyphenoxy)propane,
1-bromo-3-(2,4-dimethoxyphenoxy)propane,
1-iodo-3-(2,4-dimethoxyphenoxy)propane,
1-fluoro-3-(2,4-dimethoxyphenoxy)propane,
1-chloro-3-(2,4-dimethoxythiophenoxy)propane,
1-bromo-3-(2,4-dimethoxythiophenoxy)propane,
1-iodo-3-(2,4-dimethoxythiophenoxy)propane,
1-fluoro-3-(2,4-dimethoxythiophenoxy)propane,
1-chloro-3-(2,4-dimethoxyanilino)propane,
1-bromo-3-(2,4-dimethoxyanilino)propane,
1-iodo-3-(2,4-dimethoxyanilino)propane,
1-fluoro-3-(2,4-dimethoxyanilino)propane, etc.

Examples of oxazolidinethiones and oxazinidinethiones which may be reacted with the aforementioned haloalkanes include those having the generic formulae:

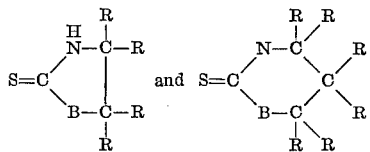

in which B is a radical selected from the group consisting of oxygen, amino and sulfur radicals and R is a radical selected from the group consisting of hydrogen and a lower alkyl radicals, such as, 2 - oxazolidinethione, 3 - oxazinidinethione, 3 -methyl - 2 - oxazolidinethione, 3 - methyl - 2 - oxazinidinethione, 4 - methyl - 2 - oxazolidinethione, 4 - methyl - 2 - oxazinidinethione, 4,4 - dimethyl - 2 - oxazolidinethione, 4,4 - dimethyl - 2 - oxazinidienethione, 4,5 - dimethyl - 2 - oxazolidinethione, 4,5 - dimethyl - 2 - oxazinidinethione, 2 - imidazolidinethione, 2 - pyrimidinethione, 2 - thiazolidinethione, 2-thiazinidinethione, 4 - methyl - 2 - imidazolidinethione, 4 - methyl - 2 - pyrimidinethione, 4 - methyl - 2 - thiazolidinethione, 4 - methyl - 2 - thiazinidinethione, 4,4-dimethyl - 2 - imidazolidinethione, 4,4 - dimethyl - 2 - pyrimidinethione, 4,4 - dimethyl - 2 - thiazolidinethione, 4,4 - dimethyl - 2 - thiazinidinethione, 4,5 - dimethyl-2-imidazolidinethione, 4,5 - dimethyl - 2 - pyrimidinethione, 4,5 - dimethyl - 2 - thiazolidinethione, 4,5 - dimethyl-2-thazinidinethione, 4,4,5 - trimethyl - 2 - imidazolidinethione, 4,4,5 - trimethyl - 2 - pyrimidinethione, 4,4,5-trimethyl - 2 - thiazolidinethione, 4,4,5 - trimethyl-2-thiazinidinethione, etc. It is to be understood that while the aforementioned compounds only list alkyl or nitro substituents on the rings, such examples are only representatives of the class of compounds which may be used and that the process of the present invention is not necessarily limited thereto.

The process of this invention may be effected in any suitable manner and may comprise either a batch or continuous type of operation. For example, when a batch type operation is used, a quantity of the starting materials comprising the haloalkanes of the type hereinbefore set forth and the oxazolidinethione or oxazinidinethione also of the type hereinbefore set forth and including, for purposes of this invention, imidazolidinethione, pyrimidinethione, thiazolidinethione and thiazinidinethone, are placed in an appropriate condensation or reaction vessel, usually in an equimolar amount. The reaction vessel into which the starting materials are placed contains a substantially inert organic solvent and a sufficient amount of a basic substance so that the reaction is effected in an alkaline medium. The vessel is then heated to the desired reaction temperature, usually the reflux temperature of the organic solvent. Following the completion of a predetermined residence time which may range from about 1 to about 10 hours, the flask and contents thereof are heated so that the solvent is allowed to evaporate. The recovered solids are then dissolved in another organic solvent such as ethyl ether, etc.; the organic extract is washed with water, dried over calcium chloride, sodium sulfate, etc. and the solvent is again allowed to evaporate. The desired sulfide comprising the novel composition of matter is then recovered. Another method of effecting the present process in a batch type operation comprises the use of a pressure apparatus. When such an apparatus is used as, for example, a rotating autoclave, the starting materials along with the solvent and basic substance are placed therein and the apparatus is sealed. If pressures greater than those which are self-induced are required, an inert gas such as nitrogen is pressed in until the desired pressure is reached. Following this, the autoclave and contents thereof are heated to the desired reaction temperature and the reaction is allowed to proceed for the predetermined residence time. At the end of this time, the autoclave and contents thereof are allowed to cool to room temperature, the excess pressure is vented and the reaction mixture is recovered. This reaction mixture is then treated in a manner similar to that hereinbefore set forth and the desired product is recovered thereby.

It is also contemplated within the scope of this invention that the proces of this invention may also be effected in a continuous manner. When such a manner is used, the starting materials are continuously charged to a reaction zone which is maintained at the proper operating conditions of temperature and pressure. The organic solvent or diluent in which the reaction is effected is also continuously charged to said reactor through separate lines or, if so desired, may be admixed with one or both of the starting materials and charged thereto in a single or double stream. In addition, the basic substance which provides the alkaline medium for the reaction is also continuously charged to a reactor in an amount sufficient to maintain the alkalinity of the solution. The reactor effluent is continuously withdrawn from the reactor and treated in a manner so that any unreacted starting materials which may be present are separated and recycled to the reactor to form a portion of the feed stock while the desired product is purified and recovered by conventional means.

Examples of novel compositions of matter which possess useful pestiologically active properties include 2-phenoxyethyl-2-oxazolyl sulfide,
2-phenoxyethyl-2-oxazinyl sulfide,
2-phenoxyethyl-2-imidazolyl sulfide,
2-phenoxyethyl-2-pyrimidyl sulfide,
2-phenoxyethyl-2-thiazolyl sulfide,
2-phenoxytehyl-2-thiazinyl sulfide,
2-(2,4-dichlorophenoxyethyl)-4,4-dimethyl-4,5-dihydro-2-oxazolyl sulfide,
2-(2,4-dichlorophenoxyethyl)-4,4-dimethyl-4,5-dihydro-2-oxazinyl sulfide,
2-(2,4-dichlorophenoxyethyl)-4,4-dimethyl-4,5-dihydro-2-imidazolyl sulfide,
2-(2,4-dichlorophenoxyethyl)-4,4-dimethyl-4,5-dihydro-2-pyrimidyl sulfide,
2-(2,4-dichlorophenoxyethyl)-4,4-dimethyl-4,5-dihydro-2-thiazolyl sulfide,
2-(2,4-dichlorophenoxyethyl)-4,4-dimethyl-4,5-dihydro-2-thiazinyl sulfide,
3-(2,4,6-trichlorophenoxypropyl)-4,4-dimethyl-4,5-dihydro-2-oxazolyl sulfide,
3-(2,4,6-trichlorophenoxypropyl)-4,4-dimethyl-4,5-dihydro-2-oxazinyl sulfide,
3-(2,4,6-trichlorophenoxypropyl)-4,4-dimethyl-4,5-dihydro-2-imidazolyl sulfide,
3-(2,4,6-trichlorophenoxypropyl)-4,4-dimethyl-4,5-dihydro-2-pyrimidyl sulfide,
3-(2,4,6-trichlorophenoxypropyl)-4,4-dimethyl-4,5-dihydro-2-thiazolyl sulfide,
3-(2,4-dichloroanilinopropyl)-4,4-dimethyl-2-thiazinyl sulfide,
3-(2,4,6-trichlohophenoxypropyl)-4,4-dimethyl-4,5-dihydro-2-thiazinyl sulfide, 2-(2,4-dichloroanilinoethyl)-2-oxazolyl sulfide,
2-(2,4-dichloroanilinoethyl)-2-oxazinyl sulfide,
2-(2,4-dichloroanilinoethyl)-2-imidazolyl sulfide,
2-(2,4-dichloroanilinoethyl)-2-pyrimidyl sulfide,
2-(2,4-dichloroanilinoethyl)-2-thiazolyl sulfide,
2-(2,4-dichloroanilinoethyl)-2-thiazinyl sulfide,
2-(2,4-dichloroanilinoethyl)-4,4-dimethyl-4,5-dihydro-2-oxazolyl sulfide,
2-(2,4-dichloroanilinoethyl)-4,4-dimethyl-4,5-dihydro-2-oxazinyl sulfide,
2-(2,4-dichloroanilinoethyl)-4,4-dimethyl-4,5-dihydro-2-imidazolyl sulfide,
2-(2,4-dichloroanilinoethyl)-4,4-dimethyl-4,5-dihydro-2-pyrimidyl sulfide,
2-(2,4-dichloroanilinoethyl)-4,4-dimethyl-4,5-dihydro-2-thiazolyl sulfide,
2-(2,4-dichloroanilinoethyl)-4,4-dimethyl-4,5-dihydro-2-thiazinyl sulfide,
4-(2,4,6-trichlorothiophenoxybutyl)-2-oxazolyl sulfide,
4-(2,4,6-trichlotothiophenoxybutyl)-2-oxazinyl sulfide,
4-(2,4,6-trichlorothiophenoxybutyl)-2-imidazolyl sulfide,
4-(2,4,6-trichlorothiophenoxybutyl)-2-pyrimidyl sulfide,
4-(2,4,6-trichlorothiophenoxybutyl)-2-thiazolyl sulfide,
4-(2,4,6-trichlorothiophenoxybutyl)-2-thiazinyl sulfide,
4-(2,4,6-trichlorothiophenoxybutyl)-4,4-dimethyl-4,5-dihydro-2-oxazolyl sulfide,
4-(2,4,6-trichlorothiophenoxybutyl)-4,4-dimethyl-4,5-dihydro-2-oxazinyl sulfide,
4-(2,4,6-trichlorothiophenoxybutyl)-4,4-dimethyl-4,5-dihydro-2-imidazolyl sulfide,
4-(2,4,6-trichlorothiophenoxybutyl)-4,4-dimethyl-2-pyrimidyl sulfide,
4-(2,4,6-trichlorothiophenoxybutyl)-4,4-dimethyl-4,5-dihydro-2-thiazolyl sulfide,
4-(2,4,6-trichlorothiophenoxybutyl)-4,4-dimethyl-4,5-dihydro-2-thiazinyl sulfide, etc.

It is to be understood that, as is the case in the starting materials, the aforementioned list of compounds which may be prepared acording to the process of this invention and which constitutes novel compositions of matter are only representatives of the class of compounds which may be prepared and that the present invention is not necessarily limited thereto.

The following examples are given to illustrate the process of the present invention which, however, are not intended to limit the generally broad scope of the present invention in strict accordance therewith.

EXAMPLE I

In this example 81 grams (0.3 mole) of 1-bromo-2-(2,4-dichlorophenoxy)ethane, 39 grams (0.3 mole) of 4,4-dimethyl-2-oxazolidinethione and 12 grams (0.3 mole) of sodium hydroxide were dissolved in 300 cc. of methyl alcohol in a reaction vessel provided with heating and refluxing means. The vessel was heated to the reflux temperature of methyl alcohol and maintained thereat for a period of about 4 hours. At the end of this time the solvent was evaporated and the residue was dissolved in ethyl ether. Following this, the ether extract was washed with water, dried over sodium sulfate and the ether solvent was then allowed to evaporate. The desired product comprising 2-(2,4-dichlorophenoxyethyl)-4,4-dimethyl)-4,5-dihydro-2-oxazolyl sulfide was recrystallized from an organic solvent, the crystals having a melting point of from 49°–51° C.

EXAMPLE II

In this example 95 grams (0.3 mole) of 1-bromo-3-(2,4,6-trichlorophenoxy)propane, 39 grams (0.3 mole) of 4,4-dimethyl-2-oxazolidinethione and 12 grams (0.3 mole) of sodium hydroxide are placed in a reaction vessel which contains 300 cc. of methyl alcohol. The vessel and contents thereof are heated to the reflux temperature of the alcohol and maintained thereat for a period of about 4 hours. At the end of this time the methyl alcohol is evaporated and the residue is dissolved in ethyl ether. The ether extract is washed with water and the resulting solution is dried over sodium sulfate. The extract is heated to evaporate the solvent. Following this, the desired product comprising 3-(2,4,6-trichlorophenoxypropyl)-4,4-dimethyl-4,5-dihydro-2-oxazolyl sulfide is recrystallized from an organic solvent and recovered.

EXAMPLE III

In this example a mixture of 81 grams (0.3 mole) of 1-bromo-2-(2,4-dichloroanilino)ethane, 43.5 grams (0.3 mole) of 4,4-dimethyl-2-oxazinidinethione and 12 grams (0.3 mole) of sodium hydroxide is dissolved in 300 cc. of methyl alcohol. The resulting solution is placed in a reaction vessel provided with heating and refluxing means. The solution is then refluxed for a period of about 4 hours, after which the methyl alcohol is evaporated. The residue is dissolved in ethyl ether and the ether extract is washed with water. The solution is then dried over sodium sulfate and the ethyl ether is allowed to evaporate. The desired product comprising 2-(2,4-dichloroanilinoethyl)-4,4-dimethyl-4,5-dihydro-2-oxazinyl sulfide in crystalline form is recovered after a purification process involving recrystallization from an organic solvent.

EXAMPLE IV

A mixture of 135.5 grams (0.3 mole) of 1-bromo-3-(2,4,6-tribromophenoxy)propane, 43.5 grams (0.3 mole) of 4,4-dimethyl-2-oxazinidinethione and 12 grams (0.3 mole) of sodium hydroxide is dissolved in 400 cc. of ethyl alcohol. The solution is placed in a reaction vessel similar to that used in the above experiments. The reacton solution is then heated and refluxed for a period of about 4 hours. At the end of this time the ethyl alcohol is allowed to evaporate and the residue is dissolved in ethyl ether. The ether extract is washed with water, dried over sodium sulfate and the ether is allowed to evaporate. The desired product comprising 3-(2,4,6-tribromophenoxypropyl)-4,4-dimethyl - 4,5 - dihydro - 2 - oxazinyl sulfide is recrystallized from an organic solvent.

EXAMPLE V

In this example a mixture of 104.5 grams (0.3 mole) of 1-bromo-4-(2,4,6 - trichlorothiophenoxy)butane, 32.7 grams (0.3 mole) of 2-oxazolidinethione and 12 grams (0.3 mole) of sodium hydroxide is dissolved in 300 cc. of methyl alcohol and the resulting solution is refluxed in a reaction vessel for a period of about 4 hours. The methyl alcohol solvent is evaporated and the residue is dissolved in ethyl ether. The ether extract is washed with water, dried over sodium sulfate and the solvent is allowed to evaporate. The desired product comprising 4-(2,4,6-trichlorothiophenoxybutyl)-2-oxazolyl sulfide in crystalline form is separated and recovered.

EXAMPLE VI

A mixture of 24.8 grams (0.3 mole) of 2-pyrimidinethione, 104.5 grams (0.3 mole) of 1-bromo-4-(2,4,6-trichlorothiophenoxy)butane and 16.2 grams (0.3 mole) of sodium methoxide is dissolved in 300 cc. of methyl alcohol. The solution is placed in a reaction vessel provided with heating and refluxing means and heated to the refluxing temperature of methyl alcohol. The solution is refluxed at this temperature for a period of about 4 hours. At the end of this time the solvent is allowed to evaporate and the recovered residue is thereafter dissolved in ethyl ether. The ether extract is treated in a manner similar to that set forth in the above examples. After the ether solvent is allowed to evaporate the desired product comprising 4 - (2,4,6 - trichlorothiophenoxybutyl) - 2 pyrimidyl sulfide is recovered.

EXAMPLE VII

In this example a mixture of 34.5 grams (0.3 mole) of 5-methyl-2-imidazolidinethione, 95 grams (0.3 mole) of 1-bromo-3-(2,4,6-trichlorophenoxy)propane and 20.4 grams of sodium ethoxide is dissolved in 300 cc. of ethyl alcohol and placed in a reaction vessel provided with heating and refluxing means. The vessel and solution are then heated to the refluxing temperature of ethyl alcohol and maintained thereat for a period of about 4 hours, following which the ethyl alcohol is allowed to evaporate. The resulting residue is thereafter dissolved in ethyl ether and the ether extract is washed with water. The solution is thereafter dried under sodium sulfate and the dried extract is heated to evaporate the solvent. Following this, the dried product comprising 3-(2,4,6-trichlorophenoxypropyl)-2-imidazolyl sulfide is recrystallized from an organic solvent and recovered.

EXAMPLE VIII

A mixture of 78.6 grams (0.3 mole) of 4,4-dimethyl-2-thiazinidinethione, 85 grams of 0.3 mole) of 1-bromo-3-(2,4-dichloroanilino)propane and 14 grams (0.3 mole) of potassium hydroxide is dissolved in 300 cc. of methyl alcohol. The solution is thereafter placed in a reaction vessel provided with heating and refluxing means and treated in a manner similar to that set forth in the above examples. After completion of the desired residence time the methyl alcohol is allowed to evaporate and the residue is also treated in a manner hereinafter set forth. The desired product, comprising 3-(2,4-dichloroanilinopropyl)-4,4-dimethyl-2-thiazonylsulfide, is recovered.

EXAMPLE IX

In this example a mixture of 34.7 grams (0.3 mole) of 2-thiazolidinethione, 95 grams (0.3 mole) of 1-iodo-2-(2,4-dichlorophenoxy)ethane and 12 grams of sodium hydroxide is dissolved in 300 cc. of ethyl alcohol and placed in a reaction vessel similar to that hereinbefore described. After refluxing the mixture at the reflux temperature and ethyl alcohol for a period of 4 hours, the ethyl alcohol is allowed to evaporate. The remaining residue is extracted with ethyl ether and the extract is washed with water. Following this the extract is dried over sodium sulfate and the ethyl ether is allowed to evaporate. The desired product comprising 2-(2,4-dichlorophenoxyethyl)-2-thiazolyl sulfide is thereafter recovered.

EXAMPLE X

An insecticidal solution is prepared by dissolving 1 gram of 2-(2,4 - dichlorophenoxyethyl)-4,4-dimethyl-4,5-dihydro to oxazolyl sulfide in 2 cc. of benzene. The solution is added to 100 cc. of water using Triton X–100 as an emulsifing agent. This insecticidal solution is sprayed into a cage containing houseflies and cause a 100% knock-down. Similar insecticidal solutions utilizing the compounds of Examples II to IX above will show similar results when used in a like manner.

We claim as our invention:
1. A compound selected from the group consisting of compounds having the formulae:

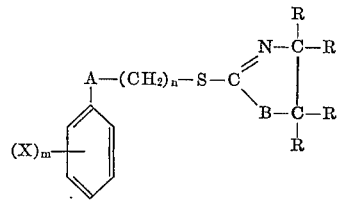

and

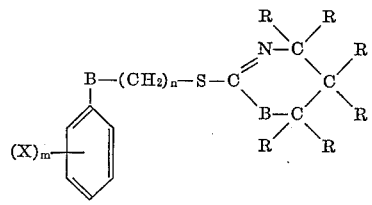

in which A is selected from the group consisting of oxygen and sulfur; B is selected from the group consisting of oxygen, sulfur and amino; R is selected from the group consisting of hydrogen, and lower alkyl; X is selected from the group consisting of chlorine, bromine, nitro, and lower alkoxy; $n$ is an integer of from 1 to 10; and $m$ is an integer of from 0 to 5.

2. The compound of claim 1 being 2-(2,4-dichlorophenoxyethyl) - 4,4-dimethyl-4,5-dihydro-2-oxazolyl sulfide.

3. The compound of claim 1 being 3-(2,4,6-trichlorophenoxypropyl) - 4,4 - dimethyl - 4,5-dihydro-2-oxazolyl sulfide.

4. The compound of claim 1 being 2-(2,4-dichloroanilinoethyl) - 4,4 - dimethyl - 4,5 - dihydro-2-oxazolyl sulfide.

5. The compound of claim 1 being 4-(2,4,6-trichlorothiophenoxybutyl)-2-pyrimidyl sulfide.

6. The compound of claim 1 being 3-(2,4-dichloroanilinopropyl)-4,4-dimethyl-2-thiazinyl sulfide.

References Cited

UNITED STATES PATENTS 2,969,362   1/1961   Tweit _____ 260—251
3,025,295   3/1962   Tweit _____ 260—251

HENRY R. JILES, Primary Examiner

R. T. BOND, Assistant Examiner

U.S. Cl. X.R.

260— 244, 251, 256.4, 256.5, 306.7, 307, 309.6;
424—246, 248, 251, 270, 272, 273; 71—90, 92, 88